(12) United States Patent
Lee et al.

(10) Patent No.: US 8,702,001 B2
(45) Date of Patent: Apr. 22, 2014

(54) APPARATUS AND METHOD FOR ACQUIRING CODE IMAGE IN A PORTABLE TERMINAL

(71) Applicant: Samsung Electronics Co., Ltd., Gyeonggi-do (KR)

(72) Inventors: Gun-Su Lee, Busan (KR); Bum-Soo Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/653,683

(22) Filed: Oct. 17, 2012

(65) Prior Publication Data

US 2013/0134221 A1 May 30, 2013

(30) Foreign Application Priority Data

Nov. 29, 2011 (KR) ........................ 10-2011-0126034

(51) Int. Cl.
*G06K 7/00* (2006.01)
*G06K 19/08* (2006.01)

(52) U.S. Cl.
USPC .............................. 235/462.04; 235/462.01

(58) Field of Classification Search
USPC .................................. 235/462.4, 462.04, 375
See application file for complete search history.

(56) References Cited

U.S. PATENT DOCUMENTS

| | | | |
|---|---|---|---|
| 7,149,000 B1* | 12/2006 | Sakai et al. ................... | 358/3.28 |
| 2002/0020747 A1* | 2/2002 | Wakamiya et al. ....... | 235/462.11 |
| 2005/0109846 A1* | 5/2005 | Lubow ....................... | 235/462.01 |
| 2006/0098241 A1* | 5/2006 | Cheong et al. ............... | 358/463 |
| 2006/0215931 A1* | 9/2006 | Shimomukai ................ | 382/284 |
| 2007/0058860 A1* | 3/2007 | Harville et al. ............... | 382/167 |
| 2007/0205596 A1* | 9/2007 | Mizuno et al. .................. | 283/79 |
| 2008/0023546 A1* | 1/2008 | Myodo et al. ............ | 235/462.04 |
| 2010/0074443 A1* | 3/2010 | Ishii et al. ....................... | 380/243 |
| 2011/0026081 A1* | 2/2011 | Hamada et al. .............. | 358/1.18 |
| 2011/0085732 A1 | 4/2011 | Cheng | |
| 2012/0314260 A1* | 12/2012 | Hakamada et al. ............. | 358/2.1 |

* cited by examiner

*Primary Examiner* — Edwyn Labaze
(74) *Attorney, Agent, or Firm* — Cha & Reiter, LLC

(57) ABSTRACT

An apparatus and method for acquiring a code image in a portable terminal includes an image recognizing unit for acquiring a picture including the code image and a code analyzing unit for verifying color information items for pixels with respect to the acquired picture, deleting a certain color information item according to a predetermined scheme when there are a plurality of color information items in order to recognize the code image having at least one of a QR code and a bar code.

20 Claims, 5 Drawing Sheets

(a)

(b)

APPARATUS AND METHOD FOR ACQUIRING CODE IMAGE IN A PORTABLE TERMINAL

CLAIM OF PRIORITY

This application claims the benefit under 35 U.S.C. §119(a) of a Korean patent application filed in the Korean Intellectual Property Office on Nov. 29, 2011 and assigned Serial No. 10-2011-0126034, the entire disclosure of which is hereby incorporated by reference.

BACKGROUND OF THE INVENTION

1. Field of the Invention

The present invention relates to an apparatus and method for acquiring a code image in a portable terminal.

2. Description of the Related Art

In accordance with rapid application developments, the portable terminals may perform not only a communication function or a schedule management function but also a game function, a remote controller function using local area communication, an image photographing function using a mounted digital camera, a wireless Local Area Network (LAN) function, etc.

Recently, a digital camera implemented in a portable terminal is frequently used to acquire a code image, which includes specific information such as a Quick Response (QR) code, a bar code, and a color code. After acquiring the code image using the camera function, the terminal may decode the acquired code image and verify code information stored in the code image.

In general, a code image is a symbol in which contents information such as a Uniform Resource Locator (URL), a phone number, and business card information is encoded. The code image provides an advantage that a user may acquire a plurality of information items easily and quickly via the code image.

In addition, the code image may be attached to a webpage, a package, a business card, etc. Here, the code image must be attached in a state where an empty space of a certain region is adequately secured to eliminate the overlapping of different images.

In another application, a mobile user may generate and impose a code image over its content being display. However, a size of a display of the portable terminal is relatively small and therefore it is difficult to find an empty space to interpose the code image so that the image is not overlapped with any content thereon.

When the code image is overlapped over other text or picture data, there is a problem in that it is impossible for the portable terminal or another portable terminal to acquire an accurate code image when the code image is overlapped with a text data or an image data as a shape of the code image is changed by the overlapping of the text data and the code image. Accordingly, there is a need for an improved scheme to insert the code image which may be overlapped with a text data (an image data) and to accurately recognize the code image overlapped with the text or image data in a portable terminal.

SUMMARY OF THE INVENTION

An aspect of the present invention is to solve at least the above-mentioned problems and/or disadvantages and to provide at least the advantages described below, by providing an apparatus and method for improving code image recognition performance in a portable terminal.

Another aspect of the present invention is to provide an apparatus and method for overlapping and outputting a code image with a text data in a portable terminal.

Another aspect of the present invention is to provide an apparatus and method for recognizing a code image overlapped with a text data in a portable terminal.

Another aspect of the present invention is to provide an apparatus and method for analyzing color information of a text data, color information of a code image, and color information of an overlapped region of the code image and the text data, thus improving the recognition of the code image in a portable terminal.

Another aspect of the present invention is to provide an apparatus and method for defining a color of a code image, a color of a text data, and a color of an overlapped region of the code image and the text data in different colors for a subsequent recognition of the code image.

In accordance with an aspect of the present invention, an apparatus for acquiring a code image in a portable terminal includes: an image recognizing unit for acquiring an image including the code image and a code analyzing unit for verifying color information items for pixels with respect to the acquired image, deleting a certain color information item in a predetermined sequence when there are a plurality of color information items, and recognizing the code image, wherein the code image includes at least one of a QR code and a bar code.

In accordance with another aspect of the present invention, a method of acquiring a code image in a portable terminal includes: acquiring an image including the code image, verifying color information items for pixels with respect to the acquired image, and deleting a certain color information in a predetermined sequence item when there are a plurality of color information items and recognizing the code image, wherein the code image includes at least one of a QR code and a bar code.

In accordance with an aspect of the present invention, an electronic device includes: one or more processors, a memory and one or more modules, each of the modules for being stored in the memory and being configured to be executed by the one or more processors, wherein each of the modules verifies color information items for pixels on an image where a code image and a text data are overlapped, deletes a certain color information item in a predetermined sequence when there are a plurality of color information items, and recognizes the code image.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Exemplary embodiments of the present invention will be described herein below with reference to the accompanying drawings. For the purposes of clarity and simplicity, well-known functions or constructions are not described in detail as they would obscure the invention in unnecessary detail.

Hereinafter, an apparatus and method for analyzing code information of a text data, code information of a code image, and color information of an overlapped region of the text data and the code image, and recognizing the code image to improve code image recognition performance in a portable terminal according to an exemplary embodiment of the present invention will be described in detail. In addition, a code image in the following description represents code information including specific information such as a QR code and a bar code. Further, the portable terminal represents a portable electronic device, such as a mobile phone, a media player, a tablet computer, a handheld computer, a Personal Digital Assistant (PDA), or any duplex system in which two or more functions are combined.

Figure 1:
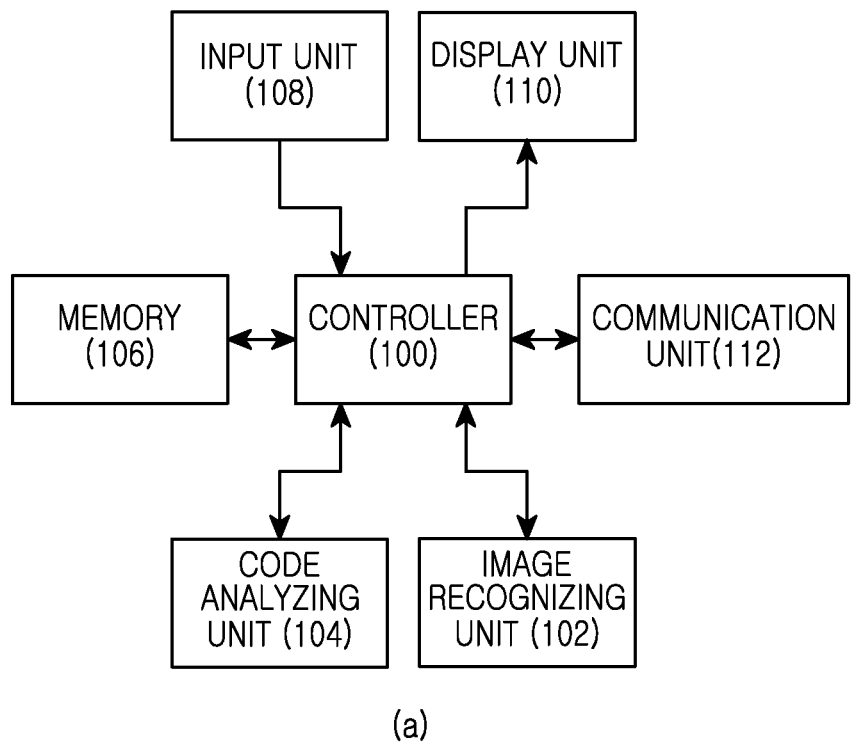
FIG. 1A illustrates a configuration of a portable terminal for recognizing a code image according to the present invention.
FIG. 1B illustrates a configuration of a code analyzing unit according to one exemplary embodiment of the present invention.
Figure 1:
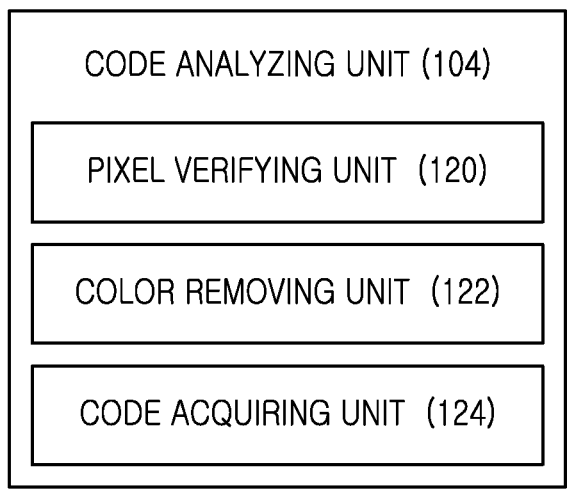

FIG. 1A is a block diagram illustrating the configuration of a portable terminal for recognizing a code image according to the present invention.

Referring to FIG. 1A, the portable terminal may include a controller 100, an image recognizing unit 102, a code analyzing unit 104, a memory 106, an input unit 108, a display unit 110, and a communication unit 112.

The controller 100 of the portable terminal controls an overall operation of the portable terminal including voice communication and data communication. In addition, the controller 100 processes and controls the acquisition of a code image which is being overlapped and output with other data items (e.g., a text data, an image data, etc.) of a document page. Herein, the document page represents a page where a data, such as a text data, an image data, and a webpage, with which a code image may be overlapped is output. Here, the controller 100 may control to assign or designate or alter the color of the overlapped region of the code image according to predetermined criteria.

When a code image is overlapped with other data items, a portable terminal displaying the overlapped image or another terminal capturing the overlapped image is unable to acquire an accurate code image as a shape of the code image is altered by the overlap. However, the portable terminal according to one exemplary embodiment of the present invention, as explained later, defines and outputs a code image, a data overlapped with the code image, and an overlapped region of the code image and the data using different colors to overcome the problem.

The controller 100 deletes color information configuring the document page in accordance with predetermined sequence and criteria, as explained later with reference to FIG. 5 and acquires the code image.

An operation of the controller 100 may be performed by a specific software module (command set) stored in the memory 106. The software module may be performed by the controller 100.

The image recognizing unit 102 and may include a camera module for acquiring the code image or a document page including the code image. Further, the image recognizing unit 102 may drive an application for recognizing a code image included in a webpage.

The code analyzing unit 104 extracts only a code image from a document page where the code image is overlapped with other data items. Herein, the code image, a data overlapped with the code image, and an overlapped region of the code image and the data are defined (assigned or designated or altered) by different colors in the document page via the controller 100, and the code analyzing unit 104 removes color information until the code image is acquired. That is, the code analyzing unit 104 may be used to recover the full code image to remove the assigned or designated or altered color of the overlapped region of the code image.

Operations of the image recognizing unit 102 and the code analyzing unit 104 may be performed by a specific software module (command set) stored in the memory 106. That is, operations of the controller 100, the image recognizing unit 102, and the code analyzing unit 104 may be performed in software or hardware. In an alternate embodiment, each of the image recognizing unit 102 and the code analyzing unit 104 may be implemented in a controller. Alternatively, the controller 100 may be defined as a processor, and the image recognizing unit 102 and the code analyzing unit 104 may be defined as another processor.

The memory 106 includes a Read Only Memory (ROM), a Random Access Memory (RAM), and a flash ROM. The ROM stores a microcode of a program, which performs process and control of the controller 100 and the code analyzing unit 104, and a variety of reference data items.

The RAM is a working memory of the controller 100 and stores a temporary data that is generated while various programs are performed. The flash ROM stores a variety of rewritable data, such as phonebook entries, outgoing messages, and incoming messages. In addition, the memory 106 stores the code image acquired by the image recognizing unit 102 according to one exemplary embodiment of the present invention. Herein, the code image, a data overlapped with the code image, and an overlapped region of the code image and the data are defined (assigned or designated or altered) by different colors via the controller 100.

The memory 106 stores a software module to perform operations of the controller 100, the image recognizing unit 102, and the code analyzing unit 104 according to one exemplary embodiment of the present invention.

The input unit 108 includes numeral key buttons of '0' to '9' and a plurality of function keys, such as a menu button, a cancel button, an OK button, a talk button, an end button, an Internet access button, a navigation key (or directional key) button, and character input keys. The input unit 108 provides a key input data corresponding to a key pushed by a user to the controller 100. According to one exemplary embodiment of the present invention, the input unit 108 provides an input data of the user who requests the acquisition of the code image to the controller 100.

The display unit 110 displays state information, characters, large volumes of moving and still pictures, etc., which are generated during operation of the portable terminal. The display unit 110 may be a color Liquid Crystal Display (LCD), an Active Matrix Organic Light Emitting Diode (AMOLED), etc. The display unit 110 may include a touch input device.

Accordingly, the display unit 110 may be used as an input device when it is applied to a touch input type portable terminal. In addition, the display unit 110 may output the code image in a state where the code image, the data overlapped with the code image, and the overlapped region of the code image and the data are defined (assigned or designated or altered) by different colors via the controller 100.

The communication unit 112 transmits and receives a Radio Frequency (RF) signal of a data that is input and output through an antenna (not shown). For example, in a transmitting mode, a data to be transmitted is subject to a channel-coding process and a spreading process, then the data is converted into an RF signal. In a receiving mode, the RF signal is received and converted into a baseband signal, and the baseband signal is subject to a de-spreading process and a channel-decoding process, thereby restoring the data.

In an alternate embodiment, the function of the code analyzing unit 104 may be implemented in the controller 100 of the portable terminal.

FIG. 1B is a block diagram illustrating the configuration of a code analyzing unit according to one exemplary embodiment of the present invention.

Referring to FIG. 1B, the code analyzing unit denoted by 104 may include a pixel verifying unit 102, a color removing unit 122, and a code acquiring unit 124.

In operation, the pixel verifying unit 120 analyzes color information for pixels with respect to an output (displayed) picture. Herein, the output picture may be a picture which outputs a code image overlapped on data items (e.g., a text data, an image data, etc.) of a document page or a picture that outputs a document page including the code image. That is, the pixel verifying unit 120 verifies the color information of the output picture for each pixel.

The color removing unit 122 successively deletes color information which exists on the output picture according to a predetermined scheme and provides the output picture to the code acquiring unit 124. The code acquiring unit 124 recognizes a code image on the output picture whose color information is deleted. Herein, because the code image, a data overlapped with the code image, and an overlapped region of the code image and the data are defined by different colors on the output picture, the color removing unit 122 removes color information according to a predetermined sequence and scheme until the code image is acquired, as later explained with reference to FIG. 5 For example, the color removing unit 122 deletes first color of the non-overlapped code image in an output picture including a first color information) about the non-overlapped code image, a second color information) about an overlapped region, and a third color information about a text data and provides the output picture to the code verifying unit 124. Therefore, the code acquiring unit 124 may recognize the code image through the output picture including the second color information and the third color information. Thereafter, when the code image, the overlapped image, and the text are displayed in different colors, the text image having a particular color is removed to display the code image and the overlapped image only, such that by recognizing two other different colors displaying the code image and the overlapped image, the controller is able to recognize the whole image of the code image. For example, deleting the color information may be replacing an RGB value of the first color information with an RGB value corresponding to white. If the RGB value of the first color information is replaced with white, it will be recognized that only the second color information and the third color information may be recognized on the output picture.

If the code acquiring unit 124 does not acquire a code image on the output picture whose first color information is deleted, the color removing unit 122 restores the first color information, deletes the second color information, and provides the output picture to the code acquiring unit 124.

After the above-described method is repeatedly performed similarly for the third color information, the code acquiring unit 124 may acquire a code image overlapped with another data of the output picture. Therefore, the code acquiring unit 124 recognizes the code image through the output picture including the second color information and the third color information.

Figure 2:
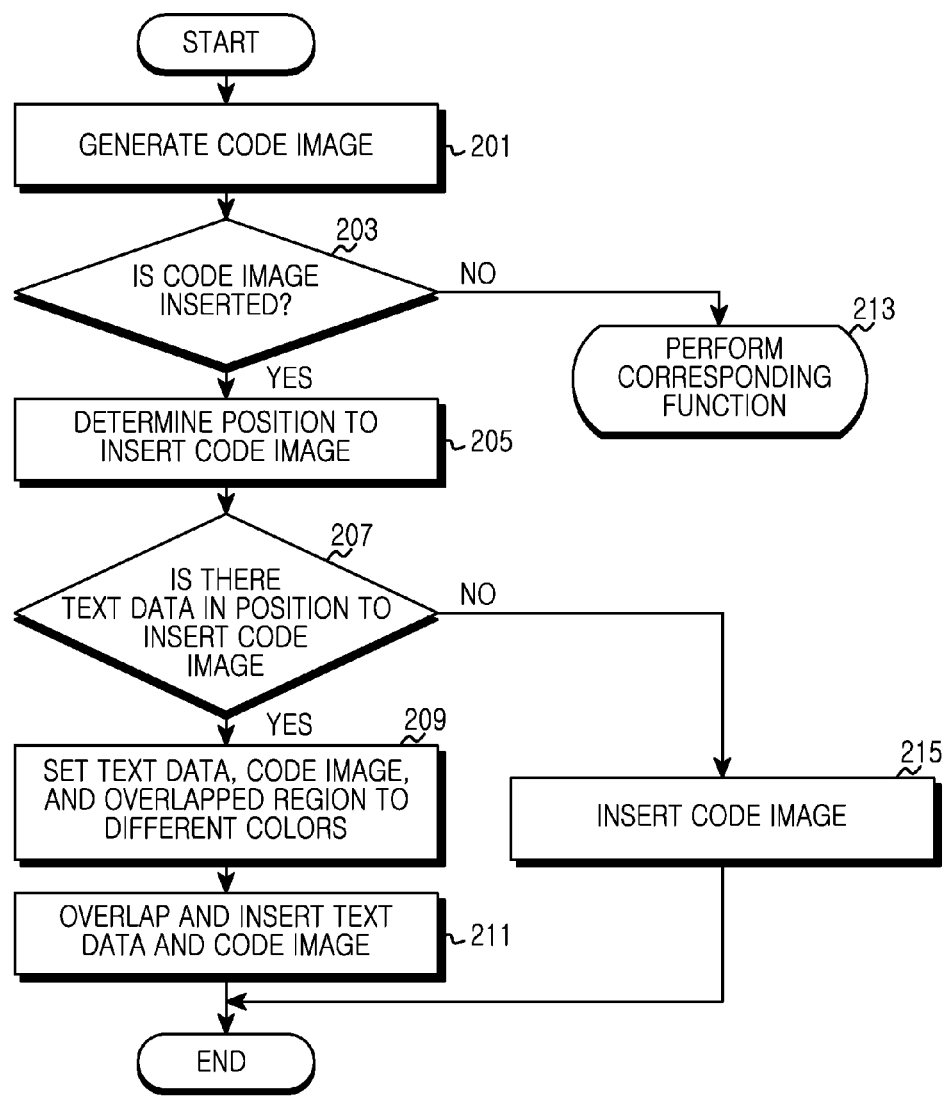
FIG. 2 is a flowchart illustrating a process of outputting a code image in a portable terminal according to the present invention.

FIG. 2 is a flowchart illustrating a process of outputting a code image in a portable terminal according to the present invention.

Referring to FIG. 2, the portable terminal overlaps and outputs a code image with a text data, an image data, etc. A size of display of the portable terminal is small and therefore, the terminal displaying the code image generates the code image overlapped over other text or picture data. Herein after, a description will be given of an example to overlap a code image on a text data. The code image may include a QR code, a bar code, etc.

The portable terminal generates a code image in step 201. Here, the generation of a code image can be achieved by the portable terminal or acquired in response to a user input or acquiring via communication from other terminal or a server. The portable terminal proceeds to step 203 and verifies whether there is an input from a user to insert the code image into a document page. Herein, the document page indicates a page which outputs a data with which a code image may be overlapped, such as a text data, an image data, and a webpage.

If the user does not want to insert the code image into the document page in step 203, the portable terminal proceeds to step 213 and performs a corresponding function (e.g., code image output).

On the other hand, if there is an input from the user to insert the code image into the document page in step 203, the portable terminal proceeds to step 205 and determines a position to insert the code image. Herein, the portable terminal may display a position of the code image on a current output page. The user of the portable terminal may change the position of the code image and may change an insertion position of the code image. That is, there is an input to change the position of the code image on a screen of the display of the portable terminal.

The portable terminal proceeds to step 207 and verifies whether there is a text data in the position to insert the code image.

If there is no the text data in the position to insert the code image in step 207, the portable terminal proceeds to step 215 and inserts the code image into a current position.

If there is the text data in the position where to insert the code image in step 207, the portable terminal proceeds to step 209 and sets the text data, the code image, and an overlapped region of the text data and the code image using different colors. Note that the code image can be received form another terminal or server for a display. The portable terminal proceeds to step 211 and overlaps the code image and the text data. Herein the coloring the text data, the code image, and an overlapped region of the text data and the code image by different colors uses a known technology.

The portable terminal which inserts the code image ends the algorithm of FIG. 2.

Figure 3:
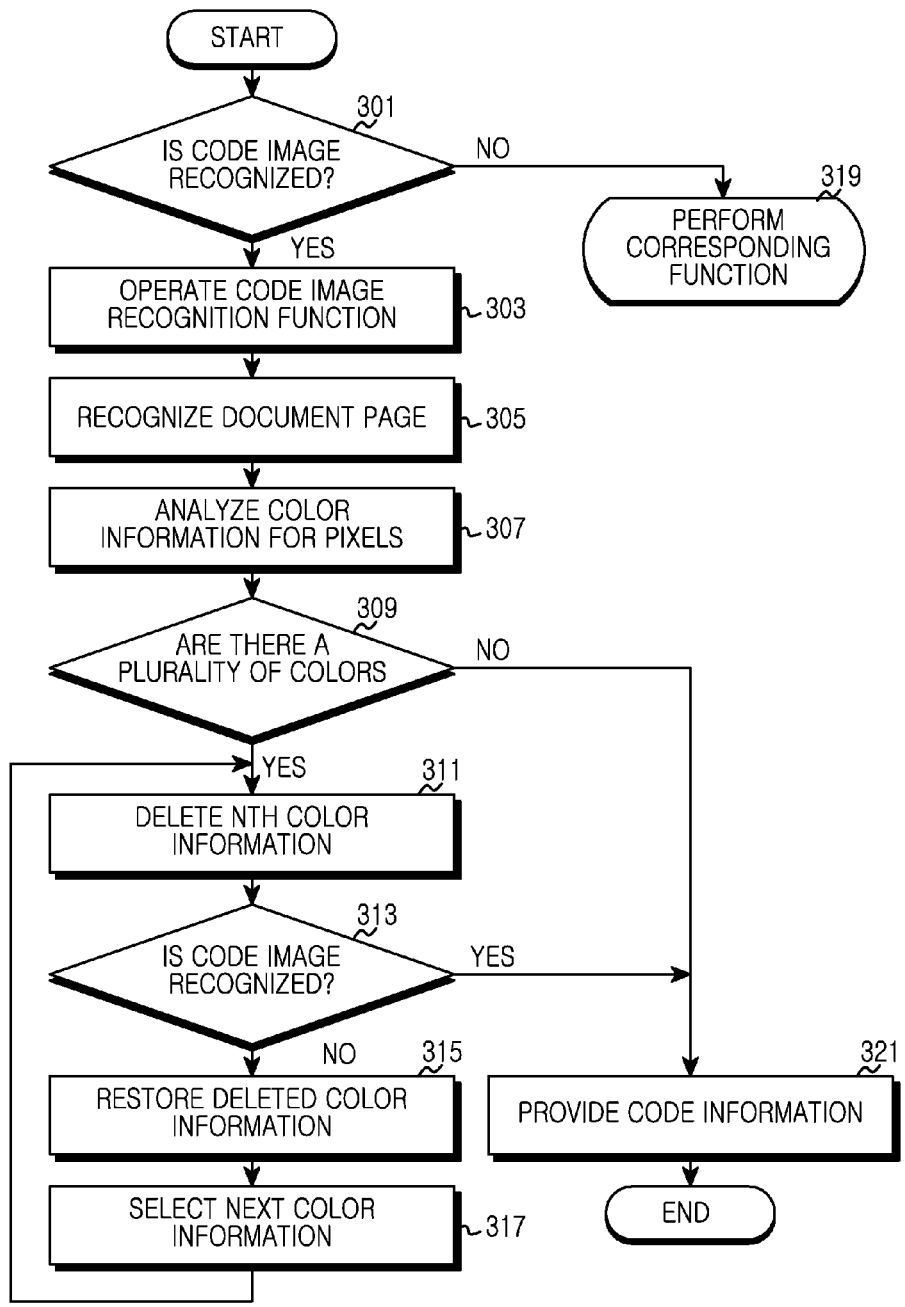
FIG. 3 is a flowchart illustrating a process of acquiring a code image in a portable terminal according to one exemplary embodiment of the present invention.

FIG. 3 is a flowchart illustrating a process of acquiring a code image in a portable terminal according to one exemplary embodiment of the present invention.

In general, when a code image is inserted into a text data via an input on a display or received from another terminal or server, it is impossible to recognize the code image accurately because an overlapped region can occur in a display unit. However, in accordance with one embodiment of the present invention, respective regions are expressed by different colors when overlap occurs and then a QR code or a bar code may be accurately recognized by a process of removing one of the different colors according to a predetermined sequence as explained later with reference to FIG. 5.

Referring to FIG. 3, the portable terminal request to recognize a code image in step 301. Herein, the code image may include a QR code, a bar code, etc.

When there is no request input from the user in step 301, the portable terminal proceeds to step 319 and performs a corresponding function (e.g., a waiting mode).

On the other hand, when there is the request input from the user of the terminal or another terminal capturing the overlapped code image to recognize the code image in step 301, the portable terminal or another terminal proceeds to step 303 and operates a function for recognizing the code image. In general, in order to acquire a code image, the portable terminal photographs or another terminal scans the code image included in a document image. For this reason, the process of step 303 may be a process of operating a camera module for photographing a code image or operating an application for acquiring a code image.

The portable terminal (or anther terminal) proceeds to step 305 and recognizes a document page including the code image. The portable terminal proceeds to step 307 and analyzes color information of the document page. The analysis of color information may be performed pixel by pixel using known technology. The document page is a picture including a text data (or image data) and a code image. As described in relation with FIG. 2, in accordance with one exemplary embodiment of the present invention, the text data and the code image of the document page and an overlapped region of the text data and the code image are previously set to different colors The portable terminal may analyze color information for pixels with respect to the document page and may verify whether the code image is overlapped on the text data of the document page using the number of the analyzed color types. For example, when it is verified that there is one type of color information item, the portable terminal determines that there is only the text data or the code image. When it is verified that there are only two color information items, the portable terminal may determine that there are the text data and the code image, but they are not overlapped. Here, we presume that the code image and the text data and the overlapped region of the document page may be set by different colors.

When three kinds of color information items are detected on the document page including the text data, the portable terminal may determine a color of the text data, a color of the code image, and a color of the overlapped region are determined, thus may determine that one type of the code image is included on the text data.

The portable terminal proceeds to step 309 and verifies whether there are a plurality of colors on the document page recognized in step 305. Herein, the document page on which there is the plurality of colors may be a document page on which the code image and the text data are overlapped and output. The reason may be that an overlapped part may be expressed by a different color when the text data of a single color and the code image of a single color are overlapped. For this reason, the process of step 309 may be a process of verifying whether there are the color of the text data, the color of the code image, and the color of the overlapped region.

If it is verified that there are no plurality of colors (for example, three colors) in the document page in step 309, the portable terminal proceeds to step 321, analyzes the code image included in the document page, and provides code information. The process of step 321 may be a process of including only the code image or the text image in the document page or a process in which the code image of the single color and the text data of the single color are not overlapped.

On the other hand, when it is verified that there are the plurality of colors on the document page, the portable terminal proceeds to step 311 and deletes color information items configuring the document page in sequence.

The portable terminal proceeds to step 313 and verifies whether a code image is recognized on the document page whose color information is deleted. That is, the portable terminal verifies whether a code image configured by two colors (the color of the code image and the color of the overlapped region of the code image and the text image) is recognized in step 313.

If the code image is not recognized in step 313, the portable terminal restores the deleted color information item in step 315. The portable terminal proceeds to step 317 and selects a next color information item.

The portable terminal proceeds to step 311 to delete the selected color information item.

On the other hand, when the code image is recognized in step 313, the portable terminal proceeds to step 321, analyzes the code image included in the document page, and provides code information. The portable terminal ends the algorithm of FIG. 3.

For illustrative purposes, assuming that a text data and a code image are overlapped, the text data may be set to black, the code image may be blue, and an overlapped region may be gray.

(1) If the blue for the code image is deleted, the portable terminal recognizes the text data configured by the color of the text data and the color of the overlapped region.

(2) If the gray for the overlapped region is deleted, the portable terminal recognizes the presence of part of the code image and the presence of part of text image in which the overlapped region is deleted.

(3) In addition, if the black for the text data is deleted, the portable terminal recognizes the code image configured by the color of the overlapped region and the color of the code image.

Figure 5:
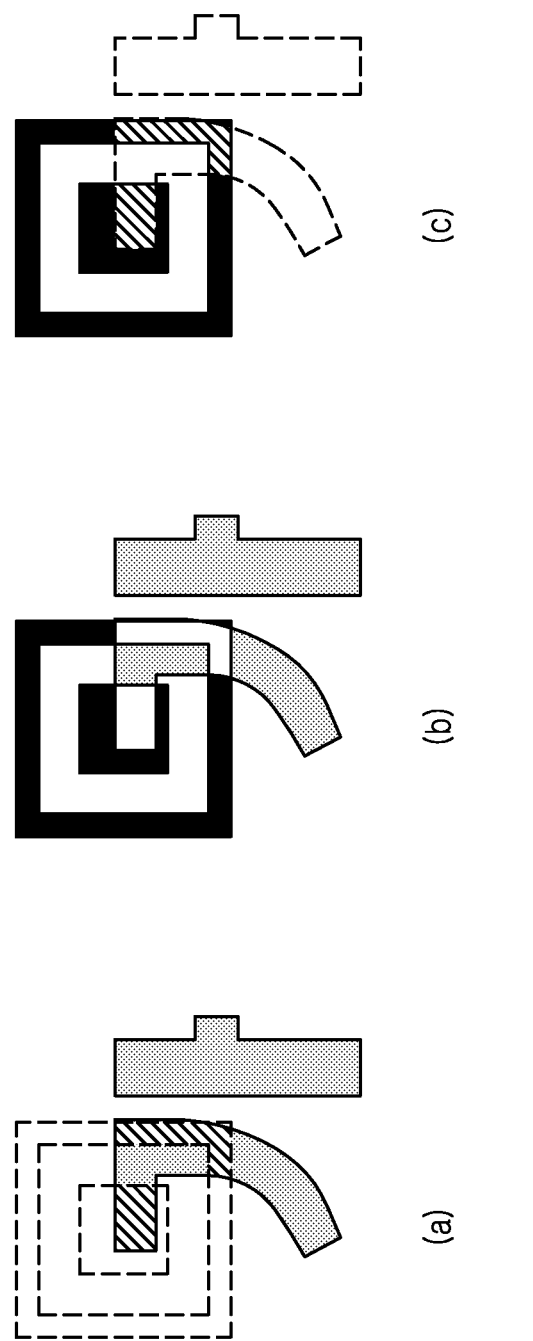
FIG. 5A to 5C illustrate a process of acquiring a code image inserted into a document page in a portable terminal according to one exemplary embodiment of the present invention.

The above (1), (2) and (3) represent the operation process that occurs in any order, and if the (3) is selected, the process may be completed at the first cycle to recognize the code image, as shown in FIG. 5.

Accordingly, the portable terminal may recognize the code image while successively deleting color information items which exist in the document page.

Alternatively, the portable terminal may delete color information items included in a document page using the following method.

(a) The portable terminal defines a background of the document page by white, sets a text data, a code image, and an overlapped region to different colors, and determines rankings of 3 colors except for the background.

(b) The portable terminal may analyze the code image while replacing one color RGB value with a value corresponding to white in order. That is, replacing the color RGB value with a value corresponding to white is used as a method of deleting the color.

Figure 4:
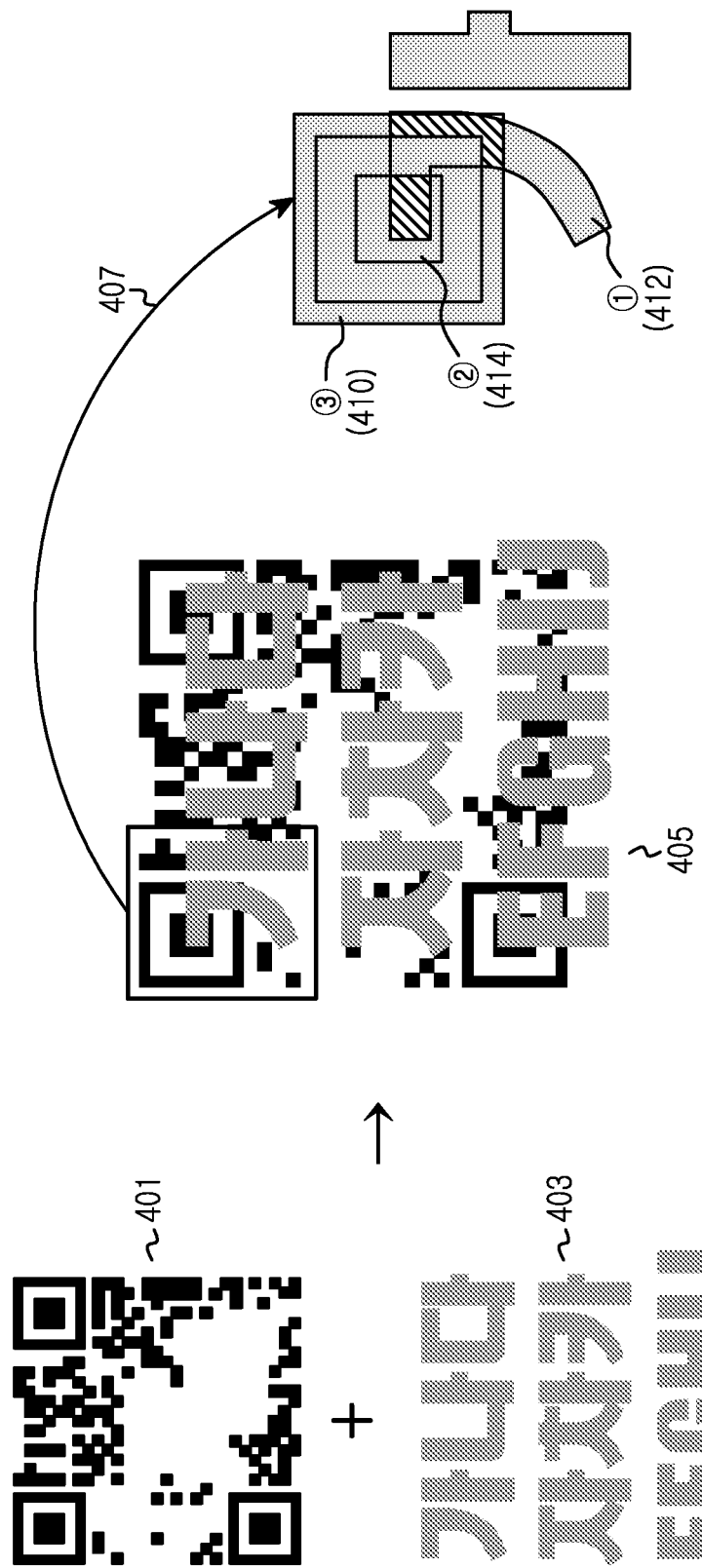
FIG. 4 illustrates a process of inserting a code image into a document page in a portable terminal according to one exemplary embodiment of the present invention.

FIG. 4 illustrates a process of inserting a code image into a document page in a portable terminal according to one exemplary embodiment of the present invention.

Referring to FIG. 4, the portable terminal may overlap and output a code image 401 on an image data or a text data 403 according to one exemplary embodiment of the present invention (405).

However, when the text data 403 and the code image 401 are overlapped, the portable terminal does not recognize the accurate code image as. a shape of the code image is changed by the overlapped text data.

For this reason, the portable terminal according to one exemplary embodiment of the present invention sets the text data and the code image to two different colors. Further, the portable terminal sets a region where the text data and the code image are overlapped with each other to another different color.

Assuming that the region where the text data and the code image are overlapped with each other is enlarged and described (407), as shown in FIG. 4, the portable terminal may set the code image to black (410) and may set the text data to gray (412).

Meanwhile, as shown in FIG. 4, the portable terminal may set the overlapped region to another color, blue for example, which is different from the color of the text data and the color of the code image, as shown as a shaded region (414).

Thereafter, the portable terminal operates to successively delete colors in a certain sequence and acquire the code image. A description for this process will be given in detail with reference to FIG. 5A to 5C.

FIG. 5A to 5C illustrate a process of acquiring a code image inserted into a document page in a portable terminal according to one exemplary embodiment of the present invention.

Referring to FIG. 5A to 5C, we presume that a text data and a code image are set to different colors and a region where the text data and the code image are overlapped with each other is set to another different color.

As described above, the portable terminal for acquiring the code image may analyze color information of a document page for pixels and may ascertain that there are three kinds of color information items on the document page.

The three kinds of the color information items included in the document page may be a color information item (first color information item) for the code image, a color information item (second color information item) for the overlapped region, and a color information item (third color information item) for the text data.

First of all, the portable terminal deletes the first color information item on the document page. Herein, deleting the first color information item may be replacing an RGB value of the first color information item with an RGB value corresponding to white. If the RGB value of the first color information is replaced with white, the portable terminal may recognize that there are only the second color information item and the third color information item on the document page.

If the first color information item is deleted, as shown in FIG. 5A, the portable terminal may recognize the text data configured by two kinds of color information items.

The portable terminal which recognizes not the code image but the text data in a state where the first color information item is deleted as described above restores the deleted first color information item and deletes the second color information item. For this reason, as shown in FIG. 5B, the portable terminal recognizes the code image and the text data. At this time, the text data and the code image have a shape in which the overlapped region is deleted.

The portable terminal which does not recognize only the code image in a state where the second color information item is deleted as described above restores the deleted second color information item and deletes the third color information item. For this reason, as shown in FIG. 5C, the portable terminal recognizes only the code image because the text data is deleted. At this time, the code image recognized by the portable terminal has a shape whose region overlapped with the text data is expressed by a different color. Accordingly, the terminal is able to detect the code image displayed by the first and second color.

As described above, the portable terminal may recognize the code image in the state where the code image is overlapped on the text data. Also, the portable terminal according to one exemplary embodiment of the present invention may recognize a code image overlapped with an image data.

Also, the programs may stored in an attachable storage device capable of accessing an electronic device through each of communication networks such as the Internet, an intranet, a Local Area Network (LAN), a Wide LAN (WLAN), and a Storage Area Network (SAN) or a communication network configured by combination of them. This storage device may connect to the electronic device through an external port. Also, a separate storage device on a communication network may connect to a portable electronic device.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims

What is claimed is:

1. An apparatus for acquiring a code image in a portable terminal, comprising:
    an image recognition unit for acquiring a display image including the code image and an object; and
    a code recognition unit for processing the acquired display image by,
        deleting a specific color region of a plurality of color regions of the acquired display image; and
        recognizing the code image based on a residual color region of the display image in response to the deletion, wherein the plurality of color regions comprise a first color region associated with an overlapped region of the code image and the object, a second color region associated with the object region excluding the overlapped region and a third color region associated with the code image region excluding the overlapped region.

2. The apparatus of claim 1, wherein the code recognition unit restores the deleted color region when the code image is not recognized in the acquired display image after the specific color region is deleted, deletes a next color region to detect the code image.

3. The apparatus of claim 1, wherein the object includes text data.

4. The apparatus of claim 3, wherein the first color region, the second color region and the third color region are associated with different colors.

5. The apparatus of claim 1, wherein the code recognition unit recognizes the code image having a region overlapped with text data expressed by a different color.

6. The apparatus of claim 1, wherein the code image is displayed in a first color, the object is displayed in a second color, and an overlapped image region is displayed in a third color.

7. The apparatus of claim 1, wherein the code recognition unit processes the acquired display image by, detecting a plurality of regions individually having a corresponding respective individual color of a plurality of predetermined different colors by determining color of individual pixels comprising an individual region item to identify individual regions of uniform color including the code image.

8. A method of acquiring a code image in a portable terminal, the method comprising:
  acquiring a display image including the code image and an object;
    deleting a specific color region of a plurality of color regions of the acquired display image; and
  recognizing the code image based on a residual color region of the display image in response to the deletion, wherein the plurality of color regions comprise a first color region associated with an overlapped region of the code image and the object, a second color region associated with the object region excluding the overlapped region and a third color region associated with the code image region excluding the overlapped region.

9. The method of claim 8, further comprising:
  restoring the deleted color region when the code image is not recognized in the acquired display image after the specific color region is deleted; and
  deleting a next color region in order to detect the code image.

10. The method of claim 8, wherein the object includes text data.

11. The method of claim 10, wherein the first color region, the second color region and the third color region are defined by different colors.

12. The method of claim 8, wherein the recognition of the code image based on a residual color region of the display image comprises recognizing the code image with region overlapped with text data expressed by a different color.

13. The method of claim 8, wherein the code image is displayed in a first color, the object is displayed in a second color, and an overlapped image is displayed in a third color.

14. The method of claim 8, including processing the acquired display image by, detecting a plurality of regions individually having a corresponding respective individual color of a plurality of predetermined different colors by determining color of individual pixels comprising an individual region to identify individual regions of uniform color including the code image.

15. An electronic device for processing a code image comprising a graphical symbol representing a link or contact data supporting access to information, comprising:
  at least one processor;
  a memory; and
  at least one executable instruction module, each of the modules for being stored in the memory and being configured to be executed by the at least one processor for,
    where a code image and a text data are overlapped,
    detecting a plurality of information items individually having a corresponding respective individual color of a plurality of predetermined different colors by determining color of individual pixels comprising an individual information item to identify individual information items of uniform color including the code image and
    deleting an individual information item of, a specific color in response to a predetermined sequence in order to remove an overlapped information item and recognize the code image.

16. The electronic device of claim 15, wherein the at least one processor restores the deleted information item in response to failure to recognize the code image in the display image after the deletion of the information item and, deletes a next color information item, and recognizes the code image in response to the predetermined sequence.

17. The electronic device of claim 15, wherein the code image, the text data, and an overlapped region of both the code image and the text data are displayed in by different colors.

18. The electronic device of claim 15, wherein the at least one processor recognizes the code image overlapped with the text data information item of a different color.

19. The electronic device of claim 15, wherein the at least one processor determines a failure to recognize a code image in response to recognizing text data of different color to the code image, overlaps the code image or in response to recognizing a picture where an overlapped region of both the code image and the text data is deleted.

20. The electronic device of claim 15, wherein the at least one processor defines the code image, the text data, and an overlapped region of both the code image and the text data using different colors.

* * * * *

UNITED STATES PATENT AND TRADEMARK OFFICE
CERTIFICATE OF CORRECTION

| | | |
|---|---|---|
| PATENT NO. | : 8,702,001 B2 | Page 1 of 1 |
| APPLICATION NO. | : 13/653683 | |
| DATED | : April 22, 2014 | |
| INVENTOR(S) | : Gun-Su Lee et al. | |

It is certified that error appears in the above-identified patent and that said Letters Patent is hereby corrected as shown below:

In the Claims

Column 12, Claim 15, Line 19 should read as follows:
--...modules being stored in...--

Column 12, Claim 17, Line 41 should read as follows:
--...are displayed in different...--

Signed and Sealed this
Twenty-fourth Day of June, 2014

Michelle K. Lee
*Deputy Director of the United States Patent and Trademark Office*